(No Model.)
H. B. JOYCE.
WATER HEATER.
No. 472,128. Patented Apr. 5, 1892.
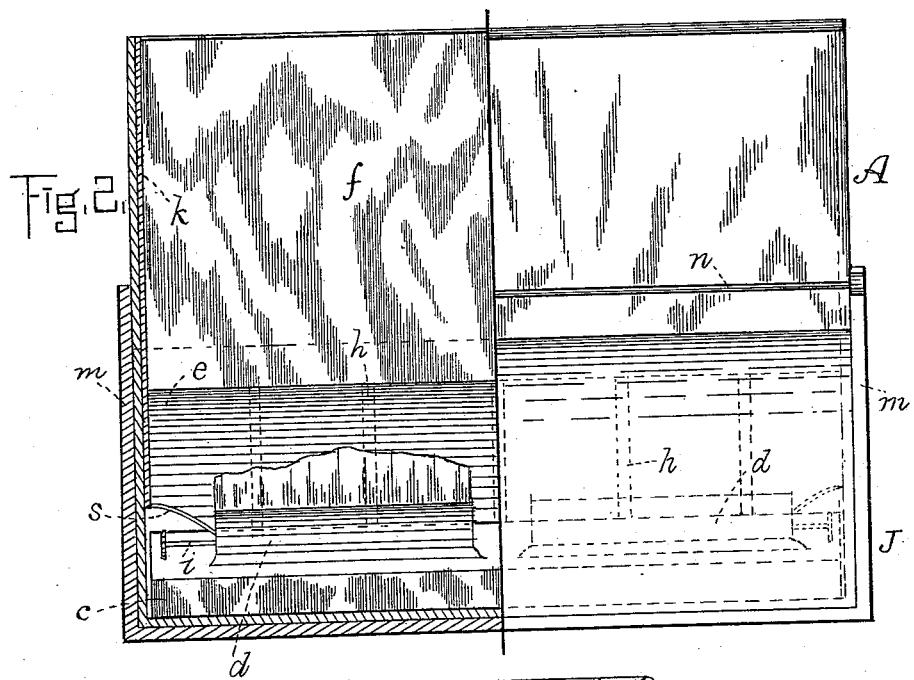
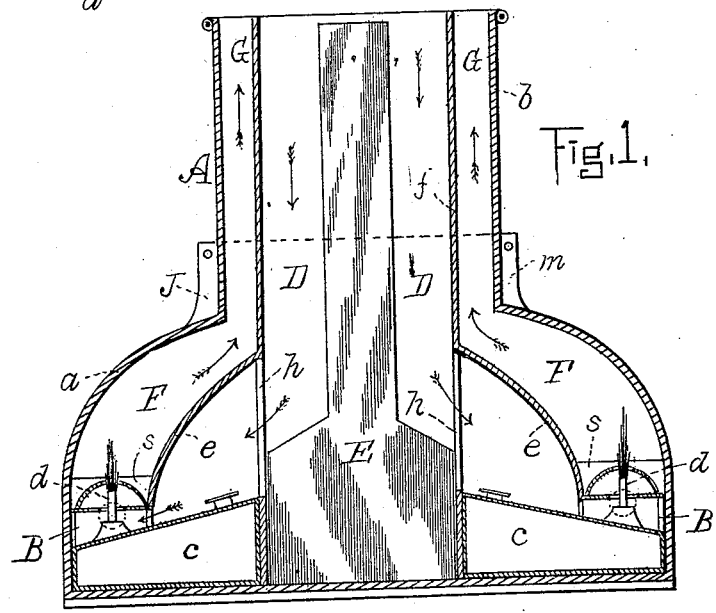
Witnesses.
Francis C. Stanwood
Richard H. Lodge
Inventor.
Hanson B. Joyce.
by H. C. Lodge Atty.

UNITED STATES PATENT OFFICE.

HANSON B. JOYCE, OF BOSTON, MASSACHUSETTS.

WATER-HEATER.

SPECIFICATION forming part of Letters Patent No. 472,128, dated April 5, 1892.

Application filed October 31, 1891. Serial No. 410,492. (No model.)

*To all whom it may concern:*

Be it known that I, HANSON B. JOYCE, a citizen of the United States, residing at Boston, in the county of Suffolk and State of Massachusetts, have invented certain new and useful Improvements in Water-Heaters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to portable heaters which are adapted to be immersed or surrounded by the liquid or material in process of heating or cooking.

My improvements consist in the peculiar construction whereby the heat from the fire or lamp is more economically applied, thus obtaining the full effects by radiation and convection.

Further details of construction will be fully hereinafter described.

The drawings represent in Figure 1 a vertical section transversely of a heater containing my invention. Fig. 2 is a side elevation with the outside casing removed in part.

The class of heaters to which my invention belongs consists of a heating agency to be contained within a portable liquid-tight casing, whereby the heating agency can be immersed in the substance—liquid or otherwise—in process of treatment. My heater in the present instance is composed of a liquid-tight vessel A, made from sheet metal. The lower portion $a$ is in cross-section bell-shaped and serves as a lamp-space, while the upper part $b$, acting as a flue, is of rectangular form and of less width. (See Fig. 1.) This exterior vessel or casing is adapted to be immersed in the liquid or subtance to be heated and contains the heating agency, which is here represented in the form of a lamp B. The latter is preferably composed of an oil-reservoir $c$, which is of a length not quite equal to that of the inclosing vessel A, with a wick tube or tubes $d$, a curved deflector $e$, and an upright back plate $f$. This lamp or lamps are removable from the vessel A, and the introduction of one is accomplished by lowering the lamp vertically until the latter rests on the bottom of the outer vessel. The lamp is then thrust transversely of the said vessel or sidewise, when contact between the front side of the lamp and the side of the vessel brings it to a stop.

When the lamp is in place, air and smoke passages are created by means of the deflector $e$ and the back plate $f$ conjointly with the side wall of the vessel A, the wick tube or tubes of the lamp being outside of said deflector, so as to form a combustion or heating chamber F between said deflector and said side wall. Furthermore, by placing the wick-tubes on one side of the center of the oil-reservoir, so as to bring the flame directly beneath the bell-shaped portion $a$, better results are obtained, since the heat by radiation and convection is transmitted to the liquid or substance which surrounds the said vessel A.

When the lamps are in position, a central feed-air flue D is formed and serves to contain a removable weight E, which holds the heater submerged in the liquid or material, and overcomes any tendency it might have to rise.

A series of ribs or supports $h$ at intervals connect the rear of the oil-reservoir with the back plate $f$.

The circulation is indicated by the arrows.

When the lamp is lighted, air-currents occur. The downdraft air-feed passage D supplies the necessary oxygen to produce proper combustion, and air passes between the weight and the back plate beneath the curved deflector, and thence to the flame. Between the outer bell-shaped part $a$ and the deflector occurs the combustion-chamber F, while the more contracted passage G, between the straight plates $b$ and $f$, serves to convey away the smoke.

To compel the air to pass about the wick-tube, as indicated, in lieu of flowing about the ends, which would otherwise occur, and due to the projecting rods $i$, whereby the wick is regulated, the deflector is formed with end wings $s$ $s$. These latter extend beyond the disks on said rods and abut against the ends of the vessel A. Moreover, to cause the ends of the back plates $f$ to fit tightly against the ends of the exterior vessel A, and thereby to prevent air-currents from passing except through the proper channels, packing-strips k, of asbestos or other material, are employed, as shown in Fig. 2.

Upon reference to the drawings it will be seen that the heater is provided with a casting J, consisting of a base and two end plates m, the latter serving to protect the ends of the vessel A and prevent them from becoming bent or injured by blows or otherwise when the heater is not in use. Longitudinal tie-rods n are employed to strengthen the said plates m, and also to fasten the heater to the casting J. Thus it will be seen that my construction embodies the simplest arrangement, since the outer casing or vessel A is merely a hollow vessel of the requisite shape for the proper radiation and convection of heat through its walls. Moreover, by the introduction of a removable heating agency the proper channels and passages for air-supply and air-combustion with smoke-exhaust are readily obtained without complication of the structure by soldering or riveting additional pieces to produce the proper air passages and flues. Lastly, by the peculiar disposition of the removable heating agencies the amount of heat generated can be readily controlled.

In the present instance I have shown a portable heater in which two lamps are used, each with double wicks, but the length of the vessel A may be increased or diminished and the lamps varied in number without departing from the spirit of my invention.

The operation of this heater is as follows: The lamps are removed for filling or lighting purposes by first taking out the weight, which serves to hold the lamps tightly pressed against the sides of the vessel A. The next step is to grasp the upper end of the back plate f and pull the lamp sidewise until its front is just beneath the plate b. The lamp is now lifted out, lighted, and returned by movements reversely of those just described. The weight is then restored to its place. By compelling the flame to strike against the bell-shaped side of the vessel the best results are obtained.

This heater is especially designed for apartments or small houses which contain no hot-water back, and are particularly serviceable in the case of hot-water baths, since the apparatus after having the lamp lighted is to be placed in the tub, the top of the vessel A, being above the water-level, and then allowed to remain there until the water has reached the desired temperature.

What I claim is—

1. A heater composed of a liquid-tight vessel open at the top and a removable lamp provided with a deflector and back plate, which, conjointly with the external walls of the heater, create a downward air-feed passage, a combustion-chamber, and an upward smoke-flue, said lamp having its wick tube or tubes outside of the said deflector to form a combustion-chamber between the latter and the outer side wall of the vessel, substantially as explained.

2. In combination with a liquid-tight vessel provided with an enlarged bell-shaped base and an open flue portion, a series of removable lamps adapted to fit within said bell-shaped base, each lamp being furnished with a deflector and a back plate to form, conjointly with the external shell of said vessel, smoke and air passages, and a weight which is interposed between the lamps to hold them in position, substantially as described and stated.

3. In combination with one or more removable lamps, each consisting of an oil-reservoir, a wick-tube, a deflector, and the upraised back plate, the inclosing water-tight vessel provided with an upright flue portion and a lower bell-shaped space, and a weight within said vessel to lock the lamps in position, substantially as set forth and described.

4. The combination, with a liquid-tight vessel A, provided with an enlarged lower part as a lamp-space, the upper flue portion, and a casting J, with its end protector-plates m, of a series of removable lamps interiorly of said vessel, and each composed of an oil-reservoir, a wick-tube, a deflector, and the upright back plate, all operating substantially as set forth and explained.

In testimony whereof I affix my signature in presence of two witnesses.

HANSON B. JOYCE.

Witnesses:
LEWIS H. BRIDGES,
H. E. LODGE.